(12) United States Patent
Zhang et al.

(10) Patent No.: US 12,042,994 B2
(45) Date of Patent: Jul. 23, 2024

(54) SUSTAINABLE ADDITIVE MANUFACTURING RESINS AND METHODS OF RECYCLING

(71) Applicant: Carbon, Inc., Redwood City, CA (US)

(72) Inventors: Mu San Zhang, San Francisco, CA (US); Kai Chen, Sunnyvale, CA (US); Jason P. Rolland, San Carlos, CA (US); Justin Poelma, Sunnyvale, CA (US)

(73) Assignee: Carbon, Inc., Redwood City, CA (US)

( * ) Notice: Subject to any disclaimer, the term of this patent is extended or adjusted under 35 U.S.C. 154(b) by 191 days.

(21) Appl. No.: 15/733,556

(22) PCT Filed: Feb. 26, 2019

(86) PCT No.: PCT/US2019/019488
§ 371 (c)(1),
(2) Date: Aug. 27, 2020

(87) PCT Pub. No.: WO2019/168807
PCT Pub. Date: Sep. 6, 2019

(65) Prior Publication Data
US 2020/0406550 A1   Dec. 31, 2020

Related U.S. Application Data (60) Provisional application No. 62/637,744, filed on Mar. 2, 2018.

(51) Int. Cl.
*B29C 64/357* (2017.01)
*B29B 17/00* (2006.01)
(Continued)

(52) U.S. Cl.
CPC ........ *B29C 64/357* (2017.08); *B29B 17/0026* (2013.01); *B29B 17/04* (2013.01);
(Continued)

(58) Field of Classification Search
None
See application file for complete search history.

(56) References Cited

U.S. PATENT DOCUMENTS 3,213,058 A   10/1965   Boyle et al.
3,694,389 A   9/1972   Levy
(Continued)

FOREIGN PATENT DOCUMENTS

CN   204955198   1/2016
DE   102010062875   6/2012
(Continued)

OTHER PUBLICATIONS

Ford et al. "Additive manufacturing and sustainability: an exploratory study of the advantages and challenges" Journal of Cleaner Production, 137(20): 1573-1587 (2016).
(Continued)

*Primary Examiner* — Robert J Grun
(74) *Attorney, Agent, or Firm* — Myers Bigel, P.A.

(57) ABSTRACT

Provided herein are methods of recycling additively manufactured objects (e.g., stereolithographically produced objects), the additively manufactured objects comprising linear polyurethane, branched polyurethane, linear polyurea, branched polyurea, a copolymer thereof, or a combination thereof. Compositions comprising the same and methods of use thereof are also provided.

21 Claims, 2 Drawing Sheets

1: Dual Cure Resin (Part A + Part B)

2: Green Object (Thermoset)

3: Further Cured Object (Extensive chain extension and minimal cross-linking)
--Melt-processable thermoplastic;
--Blend of linear polyurethane and linear (meth)acrylate chains.

(51) Int. Cl.
  *B29B 17/04* (2006.01)
  *B33Y 40/00* (2020.01)
  *B33Y 40/20* (2020.01)
  *B33Y 70/00* (2020.01)
  *C08G 18/78* (2006.01)
  *C08L 75/04* (2006.01)

(52) U.S. Cl.
  CPC .............. *B33Y 40/00* (2014.12); *B33Y 40/20* (2020.01); *B33Y 70/00* (2014.12); *C08G 18/7843* (2013.01); *C08L 75/04* (2013.01); B29B 2017/0416 (2013.01)

(56) References Cited

U.S. PATENT DOCUMENTS

| | | | |
|---|---|---|---|
| 3,932,342 | A | 1/1976 | Nagata et al. |
| 4,075,151 | A | 2/1978 | Olstowski |
| 4,785,075 | A | 11/1988 | Shimp |
| 5,236,637 | A | 8/1993 | Hull |
| 5,391,072 | A | 2/1995 | Lawton et al. |
| 5,506,007 | A | 4/1996 | Williams et al. |
| 5,529,473 | A | 6/1996 | Lawton et al. |
| 5,618,881 | A | 4/1997 | Hojabr |
| 5,667,890 | A | 9/1997 | Ballard et al. |
| 5,908,894 | A | 6/1999 | Genz et al. |
| 6,362,288 | B1 | 3/2002 | Brewer et al. |
| 6,433,121 | B1 | 8/2002 | Petrovic et al. |
| 6,569,955 | B1 | 5/2003 | Brewer et al. |
| 6,861,475 | B2 | 3/2005 | Ilenda et al. |
| 6,916,867 | B2 | 7/2005 | Gugumus |
| 7,144,955 | B2 | 12/2006 | Grace et al. |
| 7,157,586 | B2 | 1/2007 | Wood et al. |
| 7,438,846 | B2 | 10/2008 | John |
| 7,625,977 | B2 | 12/2009 | Lutz et al. |
| 7,642,316 | B2 | 1/2010 | Rego et al. |
| 7,695,643 | B2 | 4/2010 | Fritzsche et al. |
| 7,892,474 | B2 | 2/2011 | Shkolnik et al. |
| 8,088,245 | B2 | 1/2012 | Lutz et al. |
| 8,110,135 | B2 | 2/2012 | El-Siblani |
| 8,378,053 | B2 | 2/2013 | Shigemori et al. |
| 9,090,765 | B2 | 7/2015 | Schall et al. |
| 9,200,108 | B2 | 12/2015 | Bruchmann et al. |
| 9,205,601 | B2 | 12/2015 | Desimone et al. |
| 9,211,678 | B2 | 12/2015 | Desimone et al. |
| 9,216,546 | B2 | 12/2015 | Desimone et al. |
| 9,376,451 | B1 | 6/2016 | Huber et al. |
| 9,453,142 | B2 | 9/2016 | Rolland et al. |
| 9,598,606 | B2 | 3/2017 | Rolland et al. |
| 9,631,078 | B2 | 4/2017 | Escobar et al. |
| 9,676,963 | B2 | 6/2017 | Rolland et al. |
| 10,259,171 | B2 | 4/2019 | Robeson et al. |
| 10,316,213 | B1 | 6/2019 | Arndt et al. |
| 10,434,706 | B2 | 10/2019 | Robeson et al. |
| 2004/0006964 | A1 | 1/2004 | Sironi et al. |
| 2004/0067318 | A1 | 4/2004 | Jones et al. |
| 2004/0225101 | A1 | 11/2004 | Selling et al. |
| 2005/0096400 | A1 | 5/2005 | Villwock et al. |
| 2010/0137504 | A1 | 6/2010 | Kuhlmann et al. |
| 2013/0202392 | A1 | 8/2013 | Morimoto et al. |
| 2013/0292862 | A1 | 11/2013 | Joyce |
| 2013/0295212 | A1 | 11/2013 | Chen et al. |
| 2014/0371406 | A1 | 12/2014 | Esbelin et al. |
| 2015/0184039 | A1 | 7/2015 | Lutz et al. |
| 2015/0209978 | A1 | 7/2015 | Snyder et al. |
| 2015/0215430 | A1 | 7/2015 | Votour |
| 2015/0240113 | A1 | 8/2015 | Pratt et al. |
| 2015/0331402 | A1 | 11/2015 | Lin et al. |
| 2015/0360419 | A1 | 12/2015 | Willis et al. |
| 2016/0137839 | A1 | 5/2016 | Rolland et al. |
| 2016/0288376 | A1 | 10/2016 | Sun et al. |
| 2017/0129167 | A1 | 5/2017 | Castanon |
| 2017/0129169 | A1 | 5/2017 | Batchelder et al. |
| 2018/0030234 | A1 | 2/2018 | Priedeman |
| 2018/0126630 | A1 | 5/2018 | Panzer et al. |
| 2018/0243976 | A1 | 8/2018 | Feller |
| 2018/0290374 | A1 | 10/2018 | Willis et al. |
| 2019/0160733 | A1 | 5/2019 | Mirkin et al. |
| 2020/0174367 | A1 | 6/2020 | Chen et al. |
| 2023/0025425 | A1 | 1/2023 | Chen et al. |

FOREIGN PATENT DOCUMENTS

| | | |
|---|---|---|
| JP | S5745027 | 3/1982 |
| WO | 2015/109141 | 7/2015 |
| WO | 2015/164234 | 10/2015 |
| WO | 2016/145182 | 9/2016 |
| WO | 2017/112571 | 6/2017 |
| WO | 2017210298 A1 | 12/2017 |
| WO | 2018226943 A1 | 12/2018 |
| WO | 2019168807 A1 | 9/2019 |

OTHER PUBLICATIONS

International Search Report and Written Opinion corresponding to PCT/US2019/019488; dated Jul. 19, 2019 (24 pages).

Januszіewczet al. "Layerless fabrication with continuous liquid interface production" Proc. Natl. Acad. Sci. USA, 113 (42): 11703-11708 (2016).

Tumbleston et al. "Continuous liquid interface production of 3D Objects" Science, 347(6228): 1349-1352 (2015).

International Search Report and Written Opinion corresponding to PCT/US2021/013177; mailed May 21, 2021 (9 pages).

SUSTAINABLE ADDITIVE MANUFACTURING RESINS AND METHODS OF RECYCLING

CROSS REFERENCE TO RELATED APPLICATIONS

This application is a 35 U.S.C. § 371 national phase application of International Application Serial No. PCT/US2019/019488, filed Feb. 26, 2019, which claims priority to U.S. Provisional Application Serial No. 62/637,744, filed Mar. 2, 2018, the entire contents of which are hereby incorporated by reference.

FIELD OF THE INVENTION

The present invention concerns resins and methods for the production of three-dimensional objects by additive manufacturing, with objects that are suitable, at end-of-product-life, for recycling and the production of new objects in sustainable manufacturing programs.

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top-down" techniques, where light is projected onto the resin on top of the growing object, which is then immersed downward into the pool of resin.

The recent introduction of a more rapid stereolithography technique known as continuous liquid interface production (CLIP), coupled with the introduction of dual cure resins for additive manufacturing, has expanded the usefulness of stereolithography from prototyping to manufacturing (see, e.g., U.S. Pat. Nos. 9,211,678; 9,205,601; and 9,216,546 to DeSimone et al.; and also J. Tumbleston, D. Shirvanyants, N. Ermoshkin et al., Continuous 25 liquid interface production of 3D Objects, *Science* 347, 1349-1352 (2015); see also Rolland et al., U.S. Pat. Nos. 9,676,963, 9,453,142 and 9,598,606).

As the promise of additive manufacturing techniques for the production of commercial goods has moved to fruition, attention has begun to focus on the sustainability of such techniques. See generally S. Ford and M. Despeisse, *Additive manufacturing and sustainability: an exploratory study of the advantages and challenges*, Journal of Cleaner Production 137, 1573-1587 (2016). Unfortunately, the additive manufacturing techniques generally identified as suitable for recycling of polymers at end-of-product-life tend to be filament-based methods employing thermoplastic materials, and not the light-based methods employed in stereolithography. Since the filament-based methods tend to be more useful for prototyping rather than manufacturing, there is a need for new approaches to sustainable additive manufacturing programs.

SUMMARY OF THE INVENTION

Provided herein is a method of recycling additively manufactured objects, which may include one or more of the steps of: (a) providing recyclable material, the recyclable material comprised of additively manufactured objects (e.g., stereolithographically produced objects) or objects produced by flood curing scrap additive manufacturing resin (e.g., stereolithography resin), the objects optionally in fragmented and/or melt-processed form, the additively manufactured objects comprising a blend of: (i) linear polyurethane, branched polyurethane, linear polyurea, branched polyurea, a copolymer thereof, or a combination thereof, (ii) a polymerized reactive diluent (e.g., a linear poly(meth)acrylate, vinyl ether, vinyl ester, etc.) and/or a nonreactive diluent, and (iii) optionally, at least one plasticizer (e.g., a phthalate plasticizer, trimellitate plasticizer, adipate plasticizer, sebacate plasticizer, maleate plasticizer, or a naturally-derived plasticizer); (b) either: (i) melting the recyclable material, or (ii) dissolving the recyclable material in a solvent, to provide a liquid thermoplastic material; and (c) either: (i) forming a new object from the liquid thermoplastic material, or (ii) packaging the liquid thermoplastic material (e.g., the recyclable material dissolved in a solvent), thereby recycling the objects.

In some embodiments, the additively manufactured objects comprise. a blend of: (i) linear polyurethane, linear polyurea, linear copolymer thereof, or a combination thereof, and (ii) a polymerized reactive diluent (e.g., a polymerized monofunctional diluent).

In some embodiments, the forming step is carried out by molding, casting, fused deposition modeling, or binder jetting.

In some embodiments, the additively manufactured object comprises a support separated from a primary object following additive manufacturing thereof.

In some embodiments, the providing is carried out by fragmenting the objects, optionally but preferably while the objects are chilled.

In some embodiments, the fragmenting is carried out by cutting, grinding, pelletizing, or a combination thereof (e.g., cryogenic grinding).

In some embodiments, the recyclable material is melt-processed by molding, extruding, pultruding, casting, spinning, or a combination thereof.

In some embodiments, the recyclable material is in the form of sheets, fibers, filaments, or pellets.

Also provided is a composition that includes a blend of: a) a recyclable material as taught herein, and b) at least one additional thermoplastic material (e.g., a non-recycled thermoplastic polyurethane or thermoplastic rigid polyurethane). The two may be blended together either prior to, during, or after the melting or dissolving step.

In some embodiments, the composition comprises from 1 to 25% by weight of said recyclable material (e.g., from 1 to 5, 8 or 10% by weight).

In some embodiments, the composition is in the form of sheets, fibers, filaments, or pellets. In some embodiments, the composition is in the form of particles, or a powder.

In some embodiments, the objects being recycled are consumer objects or commercial objects (e.g., at end of product life). In another embodiment, the objects being recycled are supports made in the course of additively manufacturing a consumer or commercial object (i.e., a "primary object"), and separated therefrom when additive manufacturing is completed.

U.S. Pat. No. 9,453,142 to Rolland et al. describe three-dimensional products that may comprise a linear thermoplastic polyurethane, polyurea, or copolymer thereof, and states that such products may include a variety of other constituents (see column 40 lines 53-65 therein), but does not address what other constituents are in the product, or whether the complete composition is melt-processable so as to be useful in a sustainable manufacturing program.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations of one or more of the associated listed items, as well as the lack of combinations when interpreted in the alternative ("or").

Figure 1:
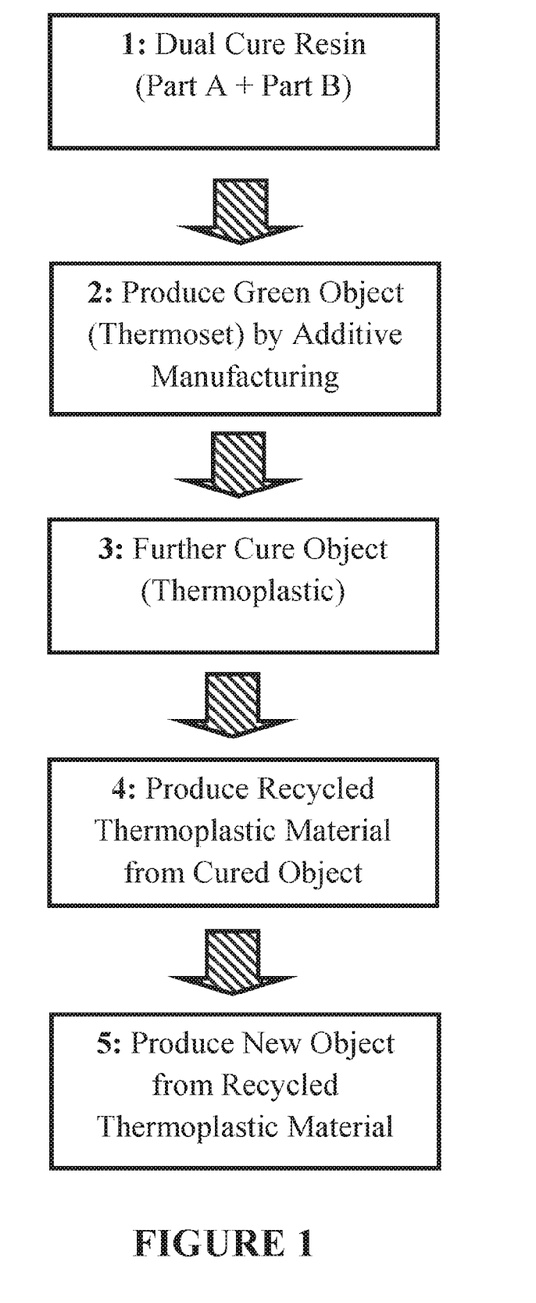
FIG. 1 is a flow chart of a sustainable manufacturing scheme of the present invention.
Figure 2:
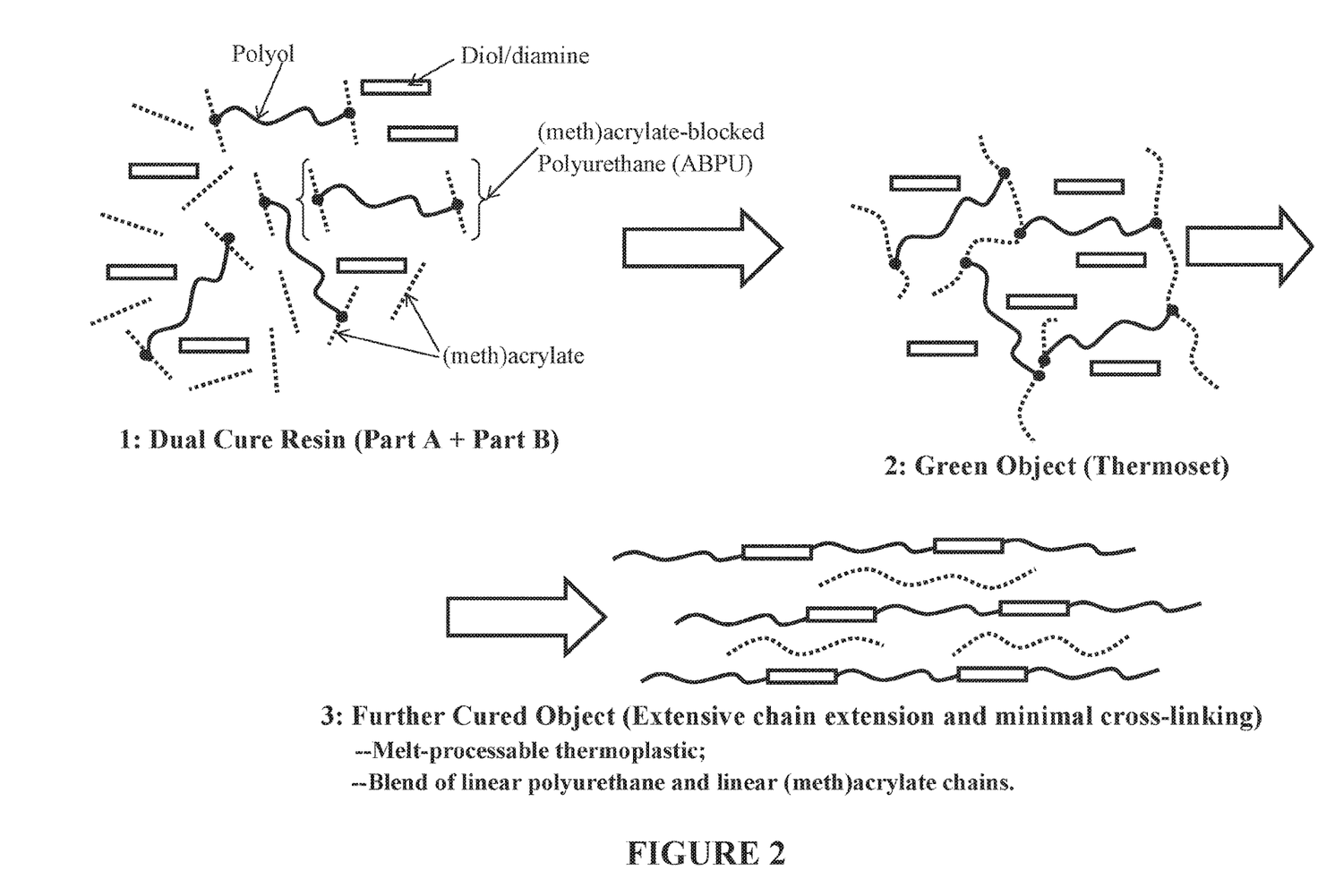
FIG. 2 schematically illustrates the stepwise transformation of a dual cure additive manufacturing resin from liquid resin, to a thermoset green article produced by additive manufacturing, to a thermoplastic finished article produced by further curing of that green article. Shown in the example scheme is a dual cure resin with a (meth)acrylate reactive diluent (free dashed line). However, other reactive diluents or non-reactive diluents (such as a carrier solvent or plasticizer) may be used in accordance with the present invention.

Numbers 1-5 in the Figures herein corresponds to sections 1-5 below.

1. Dual Cure Resins.

Dual cure polymerizable liquids (or "resins") such as polyurethane and polyurea resins useful in additive manufacturing, particularly for stereolithography techniques such as continuous liquid interface production (CLIP), are described in, for example, Rolland et al., U.S. Pat. Nos. 9,676,963; 9,598,606; and 9,453,142, the disclosures of which are incorporated herein by reference. In general, such resins may include: (a) light-polymerizable monomers and/or prepolymers that can form an intermediate object (typically in the presence of a free radical photoinitiator); and (b) heat-polymerizable (or otherwise further polymerizable) monomers and/or prepolymers.

(Meth)acrylate-blocked polyurethane (ABPU) used in such resins may be made, for example, by (a) reacting a polyisocyanate with a polyol (optionally in the presence of a catalyst such as a tin catalyst) to produce a first reaction product; and then (b) reacting the first reaction product with an amine(meth)acrylate monomer blocking agent (optionally in the presence of a catalyst) to produce a second reaction product comprising the (meth)acrylate blocked polyurethane (ABPU).

"Polyisocyanate" includes, but is not limited to, 1,6-diisocyanatohexane (HDI), methylene diphenyl diisocyanate (MDI), toluene diisocyanate (TDI), para-phenyl diisocyanate (PPDI), 4,4'-dicyclohexylmethane-diisocyanate (HMDI), isophorone diisocyanate (IPDI), triphenylmethane-4,4'4"-triisocyanate, toluene-2,4,6-triyl triisocyanate, 1,3,5-triazine-2,4,6-triisocyanate, ethyl ester L-lysine triisocyanate, etc., and combinations thereof. Numerous additional examples are known and are described in, for example, U.S. Pat. Nos. 9,200,108; 8,378,053; 7,144,955; 4,075,151, 3,932,342, and in US Patent Application Publication Nos. US 20040067318 and US 20140371406, the disclosures of all of which are incorporated by reference herein in their entirety.

"Polyol" includes, but is not limited to, a polyether (e.g., polytetramethylene oxide (PTMO), poly(trimethylene ether) glycol, etc.), polyester, or polybutadiene diol (e.g., poly (tetrahydrofuran)), etc., including combinations thereof.

An "amine (meth)acrylate monomer blocking agent" includes, but is not limited to, tertiary-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), acrylate analogs thereof, or a mixture thereof (see, e.g., US Patent Application Publication No. 20130202392).

"Free radical photoinitiator" as used herein includes type I free radical photoinitiators, such as phosphineoxide (TPO) or hydroxyacetophenone (HAP), and/or type II free radical photoinitiators, such as a benzophenone photoinitiator (optionally but preferably in combination with a co-initiator (e.g., an alcohol or amine)). Particular examples include, but are not limited to, diphenyl(2,4,6-trimethylbenzoyl)phosphine oxide (TPO), diphenylphosphinyl(2,4,6-trimethylphenyl)methanone; benzophenone; substituted benzophenones; acetophenone; substituted acetophenones; benzoin; benzoin alkyl esters; xanthone; substituted xanthones; diethoxy-acetophenone; benzoin methyl ether; benzoin ethyl ether; benzoin isopropyl ether; diethoxyxanthone; chloro-thioxanthone; N-methyl diethanol-amine-benzophenone; 2-hydroxy-2-methyl-1-phenyl-propan-1-one; 2-benzyl-2-(dimethylamino)-1-[4-(4-morpholinyl)phenyl]-1-butanone; and mixtures thereof. See, e.g., U.S. Pat. No. 9,090,765 to Henkel.

Chain extenders. Chain extenders are generally linear compounds having di- or poly-functional ends that can react with a monomer/prepolymer or crosslinked photopolymerized polymer intermediate as taught herein. Examples include, but are not limited to, polyol chain extenders, polyamine chain extenders, and mixtures thereof, which can react with isocyanates of a de-blocked diisocyanate-containing polymer. In some embodiments, inclusion of diol chain extenders are preferred in order to lower melt processing temperature.

Examples of diol or polyol chain extenders include, but are not limited to, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, hydroquinone bis (2-hydroxyethyl) ether (HQEE), glycerol, trimethylolpropane, 1,2,6-hexanetriol, and pentaerythritol.

Natural oil polyols (biopolyols) may also be used. Such polyols may be derived, e.g., from vegetable oils (triglycerides), such as soybean oil, by known techniques. See, e.g., U.S. Pat. No. 6,433,121 to Petrovic et al.

Examples of polyamine chain extenders include, but are not limited to, diamines (for example, 4,4'-methylenedicyclohexanamine (PACM), 4,4-methylenebis(2-methylcyclohexyl-amine) (MACM), ethylene diamine, isophorone diamine, diethyltoluenediamine), aromatic amines, and polyetheramines (for example, poly(tetramethylene oxide) (PTMO) diamines, JEFFAMINE® from Huntsman Corporation).

In some embodiments, the resin may include a mixture of monoamine (e.g., cyclohexamine) and diamine (e.g., MACM) chain extenders.

Reactive diluents. In some embodiments, the resin includes reactive organic diluents; that is, diluents that will degrade, isomerize, cross-react, or polymerize, with themselves or a light polymerizable component, during the additive manufacturing step. Suitable examples of diluents include, but are not limited to, N,N-dimethylacrylamide, N-vinyl-2-pyrrolidone, N-vinyl formamide, isobornyl acrylate, isobornyl methacrylate (IBOMA), lauryl acrylate, lauryl methacrylate, poly(ethylene glycol)dimethacrylate, 2-ethyl hexyl methacrylate, 2-ethyl hexyl acrylate, di(ethylene glycol) methyl ether methacrylate, phenoxyethyl methacrylate, hydroxyethyl acrylate, hydroxyethyl methacrylate, dimethyl(aminoethyl) methacrylate, butyl acrylate, butyl methacrylate, cyclohexyl methacrylate, tetrahydrofurfuryl methacrylate, tert-butylaminoethyl methacrylate, or a mixture if two or more thereof. The diluent may be included in the polymerizable liquid in any suitable amount, typically from 1, 5 or 10 percent by weight, up to about 30 or 40 percent by weight, or more.

In preferred embodiments, the reactive diluent is monofunctional (having a degree of functionality equal to 2); or, if having a degree of functionality greater than 2 (e.g., a crosslinker) it is preferably degraded at elevated temperatures.

Non-reactive diluents/plasticizers. In some embodiments, the resin includes non-reactive or non-UV curable diluents. Non-UV-curable diluents that may be used according to some embodiments include, for example, plasticizers. Specific examples of plasticizers include, but are not limited to, phthalate plasticizers such as bis(2-ethylhexyl) phthalate (DEHP), bis(2-propylheptyl) phthalate (DPHP), diisononyl phthalate (DINP); trimellitate plasticizers such as tri-(2-ethylhexyl) trimellitate (TEHTM) (TOTM); adipate plasticizers such as bis(2-ethylhexyl) adipate (DEHA), diisononyl adipate (DINA); sebacate plasticizers such as dibutyl sebacate (DBS); maleate plasticizers such as diisobutyl maleate (DBM), etc. Examples also include naturally-derived plasticizers, for example epoxidized soybean oil (ESBO) or other epoxidized vegetable oils (e.g., cashew nut oil).

In general, the reactive and/or non-reactive diluent(s) are included in an amount sufficient to reduce the viscosity of the polymerizable liquid or resin (e.g., to not more than 15,000, 10,000, 6,000, 5,000, 4,000, or 3,000 centipoise at 25 degrees Centigrade).

Accelerators. In some embodiments, the liquid may include a deoxygenating compound as an accelerator of stereolithography (particularly CLIP). An example of a suitable such accelerator is triphenylphosphine.

Additional resin ingredients. The liquid resin or polymerizable material can have (among other things) solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 μm average diameter).

The particles can comprise an active agent or detectable compound as described below, though these may also be provided dissolved or solubilized in the liquid resin as also discussed below. For example, magnetic or paramagnetic particles or nanoparticles can be employed.

The liquid resin can have additional ingredients solubilized therein, including pigments, dyes, diluents, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Dyes/non-reactive light absorbers. In some embodiments, polymerizable liquids for carrying out the present invention include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a a hydroxybenzophenone, hydroxyphenylbenzotriazole, oxanilide, benzophenone, thioxanthone, hydroxyphenyltriazine, and/or benzotriazole ultraviolet light absorber (e.g., Mayzo BLS® 1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695,643, the disclosures of which are incorporated herein by reference.

Fillers. Any suitable filler may be used in connection with the present invention, depending on the properties desired in the part or object to be made. Thus, fillers may be solid or liquid, organic or inorganic, and may include reactive and non-reactive rubbers: siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, cellulose nanocrystals, etc., including combinations of all of the foregoing. Suitable fillers include tougheners, such as core-shell rubbers, as discussed below.

Tougheners. One or more polymeric and/or inorganic tougheners can be used as a filler in the present invention. See generally US Patent Application Publication No. 20150215430. The toughener may be uniformly distributed in the form of particles in the cured product. The particles could be less than 5 microns (μm) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization.

Core-shell rubbers. Core-shell rubbers are particulate materials (particles) having a rubbery core. Such materials are known and described in, for example, US Patent Application Publication No. 20150184039, as well as US Patent Application Publication No. 20150240113, and U.S. Pat. Nos. 6,861,475, 7,625,977, 7,642,316, 8,088,245, and elsewhere. In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle. Suitable core-shell rubbers include, but are not limited to, those sold by Kaneka Corporation under the designation Kaneka Kane Ace, including the Kaneka Kane Ace 15 and 120 series of products, including Kaneka Kane Ace MX 120, Kaneka Kane Ace MX 153, Kaneka Kane Ace MX 154, Kaneka Kane Ace MX 156, Kaneka Kane Ace MX 170, Kaneka Kane Ace MX 257, and Kaneka Kane Ace MX 120 core-shell rubber dispersions, and mixtures thereof.

2. Production of "Green" Intermediate Objects by Additive Manufacturing.

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the intermediate object is formed by continuous liquid interface production (CLIP). CLIP is known and described in, for example, PCT Application Nos. PCT/US2014/015486 (U.S. Pat. No. 9,211,678); PCT/US2014/015506 (U.S. Pat. No. 9,205,601), PCT/US2014/015497 (U.S. Pat. No. 9,216,546), and in J. Tumbleston, D. Shirvanyants, N. Ermoshkin et al., Continuous liquid interface production of 3D Objects, *Science* 347, 1349-1352 (2015). See also R. Janusziewcz et al., Layerless fabrication with continuous liquid interface production, *Proc. Natl. Acad. Sci. USA* 113, 11703-11708 (2016). Other examples of methods and apparatus for carrying out particular embodiments of CLIP, or of additive manufacturing, include but are not limited to those described in B. Feller, US Patent App. Pub. No. US 2018/0243976 (published Aug. 30, 2018); M. Panzer and J. Tumbleston, US Patent App Pub. No. US 2018/0126630 (published May 10, 2018); K. Willis and B. Adzima, US Patent App Pub. No. US 2018/0290374 (Oct. 11, 2018); Batchelder et al., US Patent Appub. No. US 2017/0129169; Sun and Lichkus, US Patent App Pub. No. US 2016/0288376; Willis et al., US Patent App Pub. No. US 2015/0360419; Lin et al., US Patent App Pub. No. US 2015/0331402; and D. Castanon, US Patent App Pub. No. US 2017/0129167, the disclosures of which are incorporated by reference herein in their entirety.

In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially-cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone.

Other approaches for carrying out CLIP that can be used in the present invention and potentially obviate the need for a semipermeable "window" or window structure include utilizing a liquid interface comprising an immiscible liquid (see L. Robeson et al., WO 2015/164234), generating oxygen as an inhibitor by electrolysis (see I Craven et al., WO 2016/133759), and incorporating magnetically positionable particles to which the photoactivator is coupled into the polymerizable liquid (see J. Rolland, WO 2016/145182).

After the intermediate three-dimensional object is formed, it is optionally washed, optionally dried (e.g., air dried) and/or rinsed (in any sequence). It is then further cured as discussed below.

Objects can be washed in any suitable apparatus, preferably with a wash liquid. Wash liquids that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof. The wash liquid may be in any suitable form, such as a solution, emulsion, dispersion, etc.

Examples of organic solvents that may be used as a wash liquid, or as a constituent of a wash liquid, include, but are not limited to, alcohol, ester, dibasic ester, ketone, acid, aromatic, hydrocarbon, ether, dipolar aprotic, halogenated, and base organic solvents, including combinations thereof. Solvents may be selected based, in part, on their environmental and health impact (see, e.g., GSK Solvent Selection Guide 2009).

In some embodiments, the wash liquid consists of a 50:50 (volume:volume) solution of water and an alcohol organic solvent such as isopropanol (2-propanol).

Examples of hydrofluorocarbon solvents that may be used as wash liquids include, but are not limited to, 1,1,1,2,3,4,4,5,5,5-decafluoropentane (Vertrel® XF, DuPont™ Chemours), 1,1,1,3,3-Pentafluoropropane, 1,1,1,3,3-Pentafluorobutane, etc.

Examples of hydrochlorofluorocarbon solvents that may be used as wash liquids include, but are not limited to, 3,3-Dichloro-1,1,1,2,2-pentafluoropropane, 1,3-Dichloro-1,1,2,2,3-pentafluoropropane, 1,1-Dichloro-1-fluoroethane, etc., including mixtures thereof.

Examples of hydrofluoroether solvents that may be used as wash liquids include, but are not limited to, methyl nonafluorobutyl ether (HFE-7100), methyl nonafluoroisobutyl ether (HFE-7100), ethyl nonafluorobutyl ether (HFE-7200), ethyl nonafluoroisobutyl ether (HFE-7200), 1,1,2,2-tetrafluoroethyl-2,2,2-trifluoroethyl ether, etc., including mixtures thereof. Commercially available examples of this solvent include Novec 7100 (3M), Novec 7200 (3M).

Examples of volatile methylsiloxane solvents that may be used as wash liquids include, but are not limited to, hexamethyldisiloxane (OS-10, Dow Corning), octamethyltrisiloxane (OS-20, Dow Corning), decamethyltetrasiloxane (OS-30, Dow Corning), etc., including mixtures thereof.

3. Further Curing of Intermediate Objects.

After washing, the intermediate object is in some embodiments further cured, preferably by heating or baking.

Heating may be active heating (e.g., in an oven, such as an electric, gas, solar oven or microwave oven, heated bath, or combination thereof), or passive heating (e.g., at ambient (room) temperature). Active heating will generally be more rapid than passive heating and in some embodiments is preferred, but passive heating—such as simply maintaining the intermediate at ambient temperature for a sufficient time to effect further cure—is in some embodiments preferred.

In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate object may be heated in a stepwise manner at a first temperature of about 70° C. to about 150° C., and then at a second temperature of about 150° C. to 200 or 250° C., with the duration of each heating depending on the size, shape, and/or thickness of the intermediate object. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075).

In some embodiments, the heating step is carried out in an inert gas atmosphere. Inert atmosphere ovens are known, and generally employ an atmosphere enriched in nitrogen, argon, or carbon dioxide in the oven chamber. Suitable examples include, but are not limited to, those available from Grieve Corporation, 500 Hart Road Round Lake, Ill. 60073-2898 USA, Davron Technologies, 4563 Pinnacle Lane, Chattanooga, Tenn. 37415 USA, Despatch Thermal Processing Technology, 8860 207th Street, Minneapolis, Minn. 55044 USA, and others.

In other embodiments, the heating step is carried out in an inert liquid bath. Suitable inert liquids may be aqueous liquids (i.e., pure water, salt solutions, etc.), organic liquids (e.g., mineral oil, fluorinated, perfluorinated, and polysiloxane organic compounds such as perfluorohexane, perfluoro(2-butyl-tetrahydrofurane), perfluorotripentylamine, etc. (commercially available as PERFLUORINERT® inert liquids from 3M Company), and mixtures thereof. These inert liquids can be deoxygenated if necessary, such as by bubbling an inert gas such as nitrogen through the liquid, by boiling the inert liquid, by mixing oxygen-scavenging agents with the inert liquid medium (or contacting them to one another), etc., including combinations thereof (see, e.g., U.S. Pat. No. 5,506,007).

In some embodiments, the further curing or heating step (whether carried out in a liquid or gas fluid) is carried out at an elevated pressure (e.g., elevated sufficiently to reduce volatilization or out-gassing of residual monomers, prepolymers, chain extenders, and/or reactive diluents, etc.). Suitable pressure ranges are from 10 or 15 psi to 70 or 100 psi, or more.

Those skilled in the art will appreciate that additional post-processing steps may also be included, before or after the further curing step. Such steps include but are not limited to joining, cutting, grinding, polishing, etc. The articles may be marked with an appropriate text or symbol indicating they are to be recycled by the end-user, though this may not be necessary when the articles are manufacturing by-products such as solid supports. 4. Production of recyclable material from dual cured objects.

Objects produced as described above (including supports removed from primary objects following manufacturing) can be collected, combined with one another, and optionally fragmented (optionally while the objects are chilled) (e.g., by cutting, grinding, pelletizing, etc., including combinations thereof (e.g., cryogenic grinding)). They can be melt-processed into a new form, such as sheets, fibers, filaments, or pellets, or dissolved in a solvent to provide a liquid thermoplastic material, for molding, casting, fused deposition modeling, or binder jetting. The objects may also be fragmented or ground into a powder (with or without intervening melt-processing), which can be used for selective laser sintering. Regardless of the particular form of the recyclable material, it can be used immediately, or stored, for production of new objects as described below.

In some embodiments, the recyclable material may be blended with at least one additional thermoplastic material (e.g., two or more additional thermoplastic materials), to form a composition comprising the recyclable material. For example, the recyclable material may be blended with the at least one additional thermoplastic material prior to, during, or after melting or dissolving the recyclable material. In some embodiments, the composition may contain from 1, 5 or 10 to 25 or 30% by weight of said recyclable material, or from 1 or 2 to 5, 8 or 10% by weight of the recyclable material.

In some embodiments, the recyclable material may be a compatibilizer for additional thermoplastic material(s) in the composition, for example, for thermoplastic material(s) with amine or alcohol/ester/carboxylic acid groups (e.g., nylon or polyethylene terephthalate (PET)), which may react with an isocyanate (e.g., upon heating a blocked isocyanate) and/or a free amine of the recyclable material. A "compatibilizer" as known in the art is a substance that can increase the stability/solubility and/or improve the mechanical properties of polymer blends. See, e.g., U.S. Pat. Nos. 5,618,881, 5,667,890, 6,362,288, 6,569,955, 9,631,078, the disclosures of which are incorporated by reference. Example blends may include, for example, from 1 to 5, 8 or 10% by weight of the recyclable material.

In some embodiments, the recyclable material is provided in a solvent. The solvent may include a reactive diluent (e.g., a monofunctional reactive diluent) optionally mixed with an inert diluent.

In some embodiments, the recyclable material may be packaged to produce a packaged resin product comprising the recyclable material.

5. Production of New Objects from Recyclable Material.

New objects can be formed form the recyclable material by melting the material and forming it into a new object by any suitable technique, including but not limited to molding (such as injection molding), casting, fused deposition modeling (FDM), binder jetting, and selective laser sintering (SLS). Non-limiting examples of the types of objects that can be formed include, but are not limited to, those set forth in U.S. Pat. No. 9,453,142, subject to the limitations inherent in techniques such as injection molding.

EXAMPLES

The present invention is explained in greater detail in the following non-limiting Examples, in which: "ABPU" means (meth)acrylate blocked polyurethane; "TB" or "TBAEMA" means tertiary-butylaminoethyl methacrylate; "HMDI" means bis-(4-isocyanatocyclohexyl)methane; PO3G2k means poly(trimethylene ether)glycol with 2 k Da average molecular weight; PO3G1k means poly(trimethylene ether)

glycol with 1 k Da average molecular weight; PTMO2k means polytetramethylene oxide with 2 k Da average molecular weight; PTMO650 means polytetramethylene oxide with 650 Da average molecular weight; "DINA" means diisononyladipate; "MACM" means di(4-amino-3-methylcyclohexyl)methane; "TPO" means diphenyl(2,4,6-trimethylbenzoyl)phosphine oxide; and "IBOMA" means isobornyl methacrylate.

Example 1

Preparation of (Meth)Acrylate Blocked Polyurethanes (ABPUs)

ABPUs as described herein are prepared in substantially the same manner as described in Rolland et al., U.S. Pat. No. 9,453,142 (see, e.g., Column 40 lines 25-52 and Examples 15-16) from TBAEMA, HMDI, and PO3G2k (for ABPU-A), PO3G1k (for ABPU-B), PTMO2k (for ABPU-C), or PTMO650 (for ABPU-D), in the following molar ratios:

ABPU-A: 2.4:2.2:1.0 TBAEMA:HMDI:PO3G2k
ABPU-B: 2.4:2.2:1.0 TBAEMA:IMDI:PO3G1k
ABPU-C: 2.4:2.2:1.0 TBAEMA:HMDI:PTMO2k
ABPU-D: 2.4:2.2:1.0 TBAEMA:HMDI:PTMO650

Example 2

Preparation of a Recyclable, Elastomeric Polyurethane, Dual Cure Resin

All components of Table 1, including MACM, were mixed at 2000 rpm for 30 minutes or until the photoinitiator was completely dissolved.

TABLE 1

Elastomeric Dual Cure Resin

| Component | Mass (g) |
| --- | --- |
| ABPU-A | 23.49 |
| ABPU-B | 38.04 |
| DINA (Non-reactive diluent) | 19.89 |
| MACM (diamine chain extender) | 7.32 |
| TPO (photoinitiator) | 0.59 |
| Magenta pigment | 0.126 |

Example 3

Preparation of a Recyclable, Flexible Polyurethane, Dual Cure Resin

All components of Table 2, excluding MACM, were mixed at 2000 rpm for 30 minutes or until the solids were completely dissolved. The MACM was then added and allowed to mix in a THINKY® blender for four minutes and defoam for thirty seconds.

TABLE 2

Flexible Dual Cure Resin

| Component | Mass (g) |
| --- | --- |
| ABPU-C | 52.17 |
| ABPU-D | 8.71 |
| IBOMA (reactive diluent) | 31.41 |
| TPO (photoinitiator) | 0.99 |
| MACM (chain extender) | 6.42 |
| Tinuvin 765 (1 wt %) | 1.02 |
| Tinuvin 400 (0.7 wt %) | 0.7143 |
| Tinuvin 479 (0.3 wt %) | 0.3061 |
| Tinuvin 477 (0.4 wt %) | 0.4070 |
| Cyan Pigment | 0.0266 |

Examples 4-5

Production of Dual Cure Objects by Additive Manufacturing

From resins prepared as described in Examples 2-3 above, objects were produced on a Carbon Inc. additive manufacturing apparatus (available from Carbon Inc., 1089 Mills Way, Redwood City, Calif. 94063 USA). The objects were washed in isopropyl alcohol for 60 seconds. The object produced from the elastomeric resin of Example 2 was then baked at 120° C. for 8 hours. The object produced from the flexible resin of Example 3 was baked at 120° C. for 12 hours. The objects were soluble in tetrahydrofuran after baking indicating no crosslinking remained.

Example 6

Melt Processing of an Elastomeric Polyurethane Dual Cure Resin Object

An object produced as described in Examples 4-5 above from the resin of Example 2 was pelletized into small pieces (<2 mm$^3$). The pellets were sandwiched in between two non-stick, heat conducting plates and heated under pressure at temperatures between 190 to 300° C. (preferably 255° C. for 20 to 60 seconds). The pellets melted together and solidified into a new object.

These results show that objects produced from the resins described herein are suitable for recycling into the production of new objects in sustainable manufacturing programs.

Example 7

Melt Processing of a Flexible Polyurethane Dual Cure Resin Object

An object produced as described in Examples 4-5 above from the resin of Example 3 was pelletized into small pieces (<2 mm$^3$). The pellets were sandwiched in between two non-stick, heat conducting plates and heated under pressure at temperatures between 190 to 300° C. (preferably 255° C. for 20 to 60 seconds). The pellets melted together and solidified into a new object.

As in Example 6, these results show that objects produced from the resins described are suitable for recycling into new objects in sustainable manufacturing programs.

The foregoing is illustrative of the present invention, and is not to be construed as limiting thereof. The invention is defined by the following claims, with equivalents of the claims to be included therein.

We claim:

1. A method of recycling additively manufactured objects, comprising:

(a) providing recyclable material, the recyclable material comprised of thermoplastic additively manufactured objects or thermoplastic objects produced by flood curing scrap additive manufacturing resin, the additively manufactured objects comprising a blend of:
  (i) linear polyurethane, branched polyurethane, linear polyurea, branched polyurea, a copolymer thereof, or a combination thereof, and
  (ii) a polymerized reactive diluent;
(b) either: (i) melting said recyclable material, or (ii) dissolving said recyclable material in a solvent, to provide a liquid thermoplastic material; and
(c) either: (i) forming a new object from said liquid thermoplastic material, or (ii) packaging said liquid thermoplastic material to produce a resin, thereby recycling said objects,
wherein the method further comprises blending the recyclable material and at least one additional thermoplastic material prior to, during, or after melting or dissolving the recyclable material.

2. The method of claim 1, wherein the reactive diluent is monofunctional.

3. The method of claim 1, wherein said forming step is carried out by molding, casting, fused deposition modeling, or binder jetting.

4. The method of claim 1, wherein said additively manufactured object comprises a support separated from a primary object following additive manufacturing thereof.

5. The method of claim 1, wherein said providing is carried out by fragmenting the objects.

6. The method of claim 5, wherein said fragmenting is carried out by cutting, grinding, pelletizing, or a combination thereof.

7. The method of claim 1, wherein said recyclable material is melt-processed by molding, extruding, pultruding, casting, spinning, or a combination thereof.

8. The method of claim 1, wherein said recyclable material is in the form of sheets, fibers, filaments, or pellets.

9. A method of recycling additively manufactured objects, comprising:
  (a) providing recyclable material, the recyclable material comprised of thermoplastic additively manufactured objects or thermoplastic objects produced by flood curing scrap additive manufacturing resin, the additively manufactured objects comprising a blend of:
    (i) linear polyurethane, branched polyurethane, linear polyurea, branched polyurea, a copolymer thereof, or a combination thereof, and
    (ii) a polymerized reactive diluent;
  (b) dissolving said recyclable material in a reactive diluent, to provide a liquid thermoplastic material; and
  (c) either: (i) forming a new object from said liquid thermoplastic material, or (ii) packaging said liquid thermoplastic material to produce a resin, thereby recycling said objects.

10. The method of claim 9, wherein the additively manufactured objects comprise a blend of:
  (i) linear polyurethane, linear polyurea, linear copolymer thereof, or a combination thereof, and (ii) a polymerized reactive diluent.

11. The method of claim 10, wherein the polymerized reactive diluent is monofunctional.

12. The method of claim 9, wherein said forming step is present and is carried out by molding, casting, fused deposition modeling, or binder jetting.

13. The method of claim 9, wherein said additively manufactured objects comprise a support separated from a primary object following additive manufacturing thereof.

14. The method of claim 9, wherein said providing is carried out by fragmenting the objects.

15. The method of claim 14, wherein said fragmenting is carried out by cutting, grinding, pelletizing, or a combination thereof.

16. The method of claim 9, wherein said recyclable material is melt-processed by molding, extruding, pultruding, casting, spinning, or a combination thereof.

17. The method of claim 9, wherein said recyclable material is in the form of sheets, fibers, filaments, or pellets.

18. The method of claim 9, wherein said polymerized reactive diluent further comprises polymerized amine (meth)acrylate monomer blocking agent.

19. The method of claim 9, wherein said reactive diluent is N,N-dimethylacrylamide, N-vinyl-2-pyrrolidone, N-vinyl formamide, isobornyl acrylate, isobornyl methacrylate (IBOMA), lauryl acrylate, lauryl methacrylate, poly(ethylene glycol)dimethacrylate, 2-ethyl hexyl methacrylate, 2-ethyl hexyl acrylate, di(ethylene glycol) methyl ether methacrylate, phenoxyethyl methacrylate, hydroxyethyl acrylate, hydroxyethyl methacrylate, dimethyl(aminoethyl) methacrylate, butyl acrylate, butyl methacrylate, cyclohexyl methacrylate, tetrahydrofurfuryl methacrylate, tert-butylaminoethyl methacrylate, or a mixture of two or more thereof.

20. A method of recycling additively manufactured objects, comprising:
  (a) providing recyclable material, the recyclable material comprised of thermoplastic additively manufactured objects or thermoplastic objects produced by flood curing scrap additive manufacturing resin, the additively manufactured objects comprising a blend of:
    (i) linear polyurethane, branched polyurethane, linear polyurea, branched polyurea, a copolymer thereof, or a combination thereof, and
    (ii) a polymerized reactive diluent;
  (b) either: (i) melting said recyclable material, or (ii) dissolving said recyclable material in a solvent, to provide a liquid thermoplastic material; and
  (c) either: (i) forming a new object from said liquid thermoplastic material, or (ii) packaging said liquid thermoplastic material to produce a resin, thereby recycling said objects,
  wherein said blend further comprises at least one plasticizer.

21. The method of claim 20, wherein said plasticizer is a phthalate plasticizer, trimellitate plasticizer, adipate plasticizer, sebacate plasticizer, maleate plasticizer, or an epoxidized vegetable oil.

* * * * *

UNITED STATES PATENT AND TRADEMARK OFFICE
CERTIFICATE OF CORRECTION

| | |
|---|---|
| PATENT NO. | : 12,042,994 B2 |
| APPLICATION NO. | : 15/733556 |
| DATED | : July 23, 2024 |
| INVENTOR(S) | : Zhang et al. |

It is certified that error appears in the above-identified patent and that said Letters Patent is hereby corrected as shown below:

In the Specification

Column 9, Line 66: Please insert a paragraph break before "4."

In the Claims

Column 13, Lines 23-24, Claim 3: Please correct "step is carried out" to read --step is present and is carried out--

Column 13, Line 27, Claim 4: Please correct "object comprises" to read --objects comprise--

Signed and Sealed this
Nineteenth Day of November, 2024

Katherine Kelly Vidal
*Director of the United States Patent and Trademark Office*